United States Patent
Goubard et al.

(10) Patent No.: US 11,920,065 B2
(45) Date of Patent: Mar. 5, 2024

(54) SELF-ADHESIVE COMPOSITION FOR BONDING SUBSTRATES WITH LOW SURFACE ENERGY

(71) Applicant: BOSTIK SA, Colombes (FR)

(72) Inventors: David Goubard, Compiegne (FR); Olivier Laferte, Trosly Breuil (FR)

(73) Assignee: BOSTIK SA, Colombes (FR)

( * ) Notice: Subject to any disclaimer, the term of this patent is extended or adjusted under 35 U.S.C. 154(b) by 456 days.

(21) Appl. No.: 16/344,508

(22) PCT Filed: Oct. 24, 2017

(86) PCT No.: PCT/FR2017/052927
§ 371 (c)(1),
(2) Date: Apr. 24, 2019

(87) PCT Pub. No.: WO2018/078273
PCT Pub. Date: May 3, 2018

(65) Prior Publication Data
US 2019/0249038 A1 Aug. 15, 2019

(30) Foreign Application Priority Data
Oct. 28, 2016 (FR) ...................... 1660512

(51) Int. Cl.
*C09J 7/38* (2018.01)
*C08G 18/10* (2006.01)
*C08G 18/48* (2006.01)
*C08G 18/75* (2006.01)
*C09D 175/08* (2006.01)
*C09J 7/25* (2018.01)
*C09J 11/08* (2006.01)
*C09J 201/10* (2006.01)

(52) U.S. Cl.
CPC ............... *C09J 7/38* (2018.01); *C08G 18/10* (2013.01); *C08G 18/4825* (2013.01); *C08G 18/755* (2013.01); *C09D 175/08* (2013.01); *C09J 7/255* (2018.01); *C09J 11/08* (2013.01); *C09J 201/10* (2013.01); *C09J 2203/334* (2013.01); *C09J 2301/408* (2020.08); *C09J 2425/00* (2013.01); *C09J 2467/006* (2013.01); *C09J 2471/00* (2013.01); *C09J 2475/00* (2013.01)

(58) Field of Classification Search
CPC ..... C09J 7/38; C09J 7/255; C09J 11/08; C09J 175/08; C09J 201/10; C09J 2203/334; C09J 2301/408; C09J 2425/00; C09J 2467/006; C09J 2471/00; C09J 2475/00; C08G 18/10; C08G 18/4825; C08G 18/755; C09D 175/08
See application file for complete search history.

(56) References Cited

U.S. PATENT DOCUMENTS

| | | | |
|---|---|---|---|
| 2004/0087752 A1 | 5/2004 | Schindler et al. | |
| 2007/0123662 A1* | 5/2007 | Ueda | C08G 65/336 525/403 |
| 2010/0193127 A1 | 8/2010 | Fouquay et al. | |
| 2010/0317796 A1* | 12/2010 | Huang | C07F 7/18 524/588 |
| 2011/0052912 A1 | 3/2011 | Poivet et al. | |
| 2011/0151253 A1 | 6/2011 | Laferte et al. | |
| 2011/0172372 A1 | 7/2011 | Okamoto et al. | |
| 2013/0012653 A1 | 1/2013 | Liu | |
| 2015/0030848 A1* | 1/2015 | Goubard | C09J 171/00 428/341 |
| 2015/0166858 A1 | 6/2015 | Goubard | |
| 2015/0184043 A1 | 7/2015 | Goubard et al. | |
| 2015/0184045 A1 | 7/2015 | Goubard et al. | |

FOREIGN PATENT DOCUMENTS

| | | |
|---|---|---|
| CN | 102181256 A | 9/2011 |
| CN | 104769071 A | 7/2015 |
| CN | 104789140 A | 7/2015 |
| EP | 2310470 A1 | 4/2011 |
| EP | 2336208 A1 | 6/2011 |
| EP | 2889348 A1 | 7/2015 |
| EP | 2889349 A1 | 7/2015 |
| JP | 2004529234 A | 9/2004 |
| JP | 2011127120 A | 6/2011 |

(Continued)

OTHER PUBLICATIONS

"Dertophene T" product data sheet from DRT, available at https://www.stobec.com/DATA/PRODUIT/1452~v~data_8306.pdf, Published Aug. 2011 (Year: 2011).*
Norsolene W110 Technical Datasheet from Cray Valley (May 2010) (Year: 2010).*
ISA/EP; International Search Report and Written Opinion for International Application No. PCT/FR2017/052927 dated Dec. 11, 2017, 10 pages.
Wang, Chenghe, "Tribology of Plastics—Theory and practice of the friction, wear, and lubrication of plastic materials", China Machine Press, 1st Edition, Beijing, 1994, 13 pages. Translation Included.

(Continued)

*Primary Examiner* — Scott R. Walshon
(74) *Attorney, Agent, or Firm* — NK Patent Law

(57) ABSTRACT

A self-adhesive article comprises an adhesive layer comprising a crosslinked adhesive composition, which comprises at least one polysilylated polymer having a number-average molar mass (Mn) of at least 20000 g/mol, wherein the at least one polysilylated polymer comprises a polyether and/or polyurethane main chain and at least two hydrolysable silylated end groups, said silylated end groups being attached to the main chain of the polymer by a urethane or ether function (referred to as a connector group); at least one tackifying resin having an average hydroxyl number of less than or equal to 100; and at least one crosslinking catalyst, excluding any monosilylated polymer.

14 Claims, No Drawings

(56) References Cited

FOREIGN PATENT DOCUMENTS

| | | |
|---|---|---|
| JP | 2011153309 A | 8/2011 |
| JP | 2013525543 A | 6/2013 |
| JP | 2015526547 A | 9/2015 |
| WO | 2009016285 A1 | 2/2009 |
| WO | 09/106699 A2 | 9/2009 |
| WO | 2010/002557 A1 | 1/2010 |
| WO | 2013136108 A1 | 9/2013 |
| WO | 2014006189 A1 | 1/2014 |

OTHER PUBLICATIONS

CNIPA; Office Action for Chinese Patent Application No. 201780081039.2 dated Apr. 26, 2021, 4 pages.
JPO; Notice of Reasons for Rejection for Japanese Patent Application No. 2019-523582 dated Jun. 29, 2021, 5 pages.

* cited by examiner

SELF-ADHESIVE COMPOSITION FOR BONDING SUBSTRATES WITH LOW SURFACE ENERGY

CROSS-REFERENCE TO RELATED APPLICATIONS

This application is a U.S. National Stage application of International Application No. PCT/FR2017/052927, filed Oct. 24, 2017, which claims the benefit of French Patent Application No. 1660512, filed Oct. 28, 2016.

FIELD OF INVENTION

The present invention relates to the bonding of low-surface-energy substrates, in particular plastic substrates, especially thermoplastic low-surface-energy substrates. In particular, the present invention relates to a specific hot melt adhesive composition having self-adhesive properties after moisture crosslinking, as well as a self-adhesive article such as a multilayer system, intended for that purpose.

TECHNOLOGICAL BACKGROUND OF THE INVENTION

Hot melt adhesives (or HM) are solid substances at room temperature that contain no water or solvent. They are applied in molten state and solidify during cooling, thus forming a sealant which secures the substrates to be assembled. Some Hot Melts are formulated to provide a relatively hard and tack-free character to the coated support. Other Hot Melts provide the support with a relatively soft and highly tacky nature: these are PSAs widely used for manufacturing self-adhesive labels; the corresponding adhesives are referred to as "Hot Melt Pressure Sensitive Adhesive" (or HMPSA).

Pressure sensitive adhesives (PSA) are substances which confer the support layer, which is coated with them, immediate tack (or tackiness) at room temperature, which facilitates its instantaneous adhesion to the substrate under light and brief pressure. PSAs are widely used for manufacturing labels or self-adhesive films which are attached to articles for the purpose of presenting information (such as bar code, name, and price) and/or for decorative purposes, during permanent or temporary bonding. PSAs are also used in the sustainable labelling of electrical, electronic, or mechanical parts, for which the information needs to be affixed over long periods of time—several years—and/or under difficult operating conditions in the presence of solvents, chemicals, natural or artificial light, radiation, with movements and deformations regularly or occasionally generated, manually or by machinery. PSAs are also used for manufacturing self-adhesive tapes for various uses. For example, in addition to transparent adhesive tape widely used in everyday life, they can be used in the construction of objects or buildings, in various industrial applications; such as shaping and assembling cardboard packaging; surface protection for painting work in construction; the maintenance of electrical cables in the transport industry; carpet bonding with double-sided adhesive tape; the assembly of components or equipment in the automobile industry, construction, the textile industry, the wood and plastics industry; the assembly of electrical or electronic devices, tools and professional or consumer equipment.

For manufacturing multilayer systems and in particular self-adhesive labels and/or tapes, PSAs are often applied by continuous coating processes over the entire surface of a large support layer (printable where appropriate), in a quantity (usually expressed in $g/m^2$) hereinafter referred to as "weight per unit area". The support layer is made of paper or film of a single or multi-layered polymeric material. The adhesive layer which covers the support layer can itself be covered with a release liner, for example consisting of a silicone film. The multilayer system obtained is generally packaged in the form of large coils up to 2 m wide and 1 m in diameter, which can be stored and transported.

These multilayer systems can be subsequently converted into end-user-applicable self-adhesive labels, by means of transformation processes that include printing the desired informative and/or decorative components on the printable surface of the support layer, and then cutting to desired shape and dimensions. The release liner can be easily removed without modifying the adhesive layer which remains attached to the support layer. After separation of its release liner, the label is applied to the surface of the substrate to be coated either manually or using labelers on automated packaging lines.

These multilayer systems can also be converted into self-adhesive tapes by cutting and packaging rolls of fixed width and length.

Due to their high tack at room temperature, PSAs generally make it possible to grip or attach rapidly the self-adhesive label and/or tape to the substrate to be coated, suitable for obtaining significant industrial production rates.

The nature of a substrate's surface can be characterized by its surface energy. This can be quantified in a manner well known to the person skilled in the art, from the measurement of the contact angle and calculated according to the Owens & Wendt model.

At a comparable surface condition, a PSA composition suitable for bonding to high surface energy (or surface tension) substrates, such as glass or metals which are inorganic polar substrates, will not necessarily be suitable for bonding to low-surface-energy substrates, such as substrates comprising polymeric materials based on ethylene or propylene type monomers and comonomers, commonly known as polyethylene (PE) and polypropylene (PP) substrates, which are nonpolar organic substrates. Also included in the category of low-surface-energy substrates are polymeric materials based on other olefinic monomers, and in general all coatings on films or objects, which are difficult to bond with PSAs.

Low-surface-energy substrates, as mentioned above, are known to be difficult to bond and often require specifically treating said surface prior to laminating the self-adhesive portion of the label or tape. These treatments are well known to the person skilled in the art and consist of chemically and/or physically modifying the surface of the substrate to increase the surface energy and/or the roughness of said surface, and thus to improve the adhesion of the adhesive on the substrate. For example, it is possible to treat the surface of the substrate with a plasma or corona treatment, an abrasion or application of a chemical anchoring agent (also called primary) on said surface to be treated, in order to favourably modify the surface energy of the substrate.

Without such surface treatments, adhesion of the adhesive layer to this type of substrate is often insufficient to effectively secure the label or adhesive tape to the surface of said substrate. The effectiveness of such a bonding should be considered according to the type of intended application. Typically, it is desirable that the adhesive sealant ensuring the attachment of the two objects has a minimum resistance to one or more of the following constraints: peeling, tearing, or shearing. It is also desirable that these properties be maintained over a wide temperature range, especially when the adhesive sealant (likewise, that the product coated with the label and/or adhesive tape) can be subject to temperature variations, for example during transport, storage and application. It is also desirable that these advantageous properties are not degraded over time or are at least maintained for a significantly long time, connected, for example, with the use or the lifetime of the self-adhesive article or coated product of said self-adhesive article. In certain applications, a certain breaking point of the adhesive sealant is sought with respect to the surface of the substrate. Preferentially a homogeneous rather than a jerky adhesive joint break is recommended.

Patent applications WO 2009/016285 and EP 2336208 concern adhesive compositions usable for manufacturing labels and/or self-adhesive tapes, based on a particular disilylated polyurethane. In particular, the examples illustrate compositions comprising a disilyl polyurethane having a Mn of less than 20,000 g/mol and a terpene phenol tackifying resin.

However, it has been found that the adhesive compositions exemplified in the aforementioned applications are not entirely satisfactory and are in need of improvement, in terms of adhesive performance or bonding efficiency, on low-surface-energy substrates.

However, in some areas of application of PSA, the use of the aforementioned surface treatments to overcome the low adhesive performance of the adhesive composition vis-à-vis these substrates is not suitable. Indeed, one of the disadvantages of these treatments is that it results in an additional step in the process of manufacturing products coated with a self-adhesive article, thus generating additional costs and constraints in the production lines of these products. In addition, these treatments by modifying the physical-chemical properties of the surface of the substrates can lead to embrittlement of the substrate surface or induce aesthetically undesirable effects such as loss of transparency or change in the surface colour of the substrate, which can be troublesome when the support layer of the self-adhesive article is for example transparent or translucent, the surface of the substrate thus being visible. These treatments can also lead to heterogeneous surfaces, poorly reproducible and unsustainable bonding, which can require another pretreatment of the surface of the substrate before affixing the adhesive portion of the self-adhesive article.

Thus, in recent years, new self-adhesive bonding solutions adapted to manufacturing self-adhesive labels suitable for bonding on low-surface-energy substrates have emerged.

Pressure-sensitive adhesive compositions based on acrylate-type polymers (or copolymers) are known, for example, as described in patent application EP 2310470 of 3M.

However, the preparation of these polymers and their use in the formulation of these adhesive compositions requires the use of a large amount of solvent which is restrictive for the production of self-adhesive articles because it requires an additional step of removal of the solvent and/or, where appropriate, special dedicated facilities. In addition, the use of acrylic polymers also has the disadvantage of generating unpleasant odours due to the presence of residual monomers or residual solvents.

Thus, there is a need to develop novel pressure sensitive adhesive compositions capable of adhering to any type of surface, including surfaces of low-surface-energy substrates known to be difficult to bond, without presenting all or some of the disadvantages of the prior art.

It has now been found that the composition that is the subject of the present application makes it possible to bond more effectively on any type of surface, including low-surface-energy substrates regardless its surface condition.

In particular, the adhesive composition according to the invention possesses, in the crosslinked state, improved adhesive performance, especially in terms of cohesion, on surfaces of low-surface-energy substrates, with a comparable surface condition, with respect to polysilyl polymer based pressure-sensitive adhesive compositions of the prior art disclosed in WO 2009/016285 and EP 2336208.

These advantages are achieved without the necessity to add one or more additional monosilylated polymers.

In particular, the adhesive composition according to the invention possesses, in the crosslinked state, excellent adhesion performance for bonding surfaces of plastic low-surface-energy substrates, preferably at least comparable to the measured performances for the current acrylic self-adhesive solutions.

In particular, the adhesive composition according to the invention possesses, in the crosslinked state, an adhesive force measured according to the peel test at 1800 of at least 4 N/cm, on a substrate having a surface energy below or equal to 40 mN/m, and in particular a polyolefin plastic substrate, such as HDPE and PP.

In particular, the adhesive composition according to the invention also makes it possible to manufacture self-adhesive articles capable of rapidly and durably adhering to such surfaces.

In particular, the adhesive composition according to the invention is easy to implement and makes it possible to manufacture self-adhesive articles on high speed production lines.

In the present application, the term "low-surface-energy substrate" refers to a substrate having at least one surface with a surface energy, measured at 23° C. at 50% relative humidity, at atmospheric pressure of 1 bar, in air, less than or equal to 40 millinewtons per meter (mN/m) or millijoules per square meter (mJ/m$^2$). The surface energy of a substrate can be quantified in a manner well known to the person skilled in the art from the measurement of the contact angle and calculated according to Owens & Wendt's model.

The low-surface-energy substrates on which the adhesive according to the invention is intended to be applied preferably have a surface energy ranging from 23 to 38 mN/m (or mJ/m$^2$), more preferably from 25 to 35 mN/m.

SUMMARY OF THE INVENTION

The present invention therefore firstly relates to the use of a self-adhesive article comprising an adhesive layer consisting of an adhesive composition in the crosslinked state, said adhesive composition comprising:
  A) at least one polysilylated polymer having a number-average molar mass (Mn) of at least 20000 g/mol, and selected from polymers comprising a polyether and/or polyurethane main chain and at least two hydrolysable silyl end groups, said silylated end groups being attached to the main chain of the polymer by a urethane or ether function (referred to as a connector group),
  B) at least one tackifying resin having an average hydroxyl number less than or equal to 100, preferably less than or equal to 50, and more preferably zero, and
  C) at least one crosslinking catalyst,
  D) excluding any monosilylated polymer (that is, not comprising a monosilylated polymer),
  for coating a substrate, preferably plastic-based, having a surface energy measured at 23° C., at 50% relative humidity, at atmospheric pressure of 1 bar, in air, less than or equal to 40 mN/m, the adhesion strength of the self-adhesive article on said substrate measured by peeling at 1800 being at least 4N.

According to one embodiment, the self-adhesive article comprises a support layer and an adhesive layer constituted by the adhesive composition according to the invention. In particular, the self-adhesive article is a self-adhesive label or a self-adhesive tape.

According to one embodiment, the polysilylated polymer(s) A) correspond(s) to the following formula: formula (I):

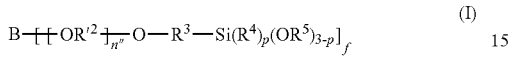
(I)

wherein:
- B represents a divalent hydrocarbonated radical (for f=2) or trivalent (for f=3) comprising 2 to 66 carbon atoms, linear, branched, cyclic, alicyclic or aromatic, saturated or unsaturated, optionally comprising one or more heteroatoms, such as O, N,
- $R^3$ represents a linear or branched divalent alkylene radical comprising from 1 to 6 carbon atoms,
- $R'^2$ represents a linear or branched divalent alkylene radical comprising from 2 to 4 carbon atoms,
- $R^4$ and $R^5$, identical or different, each represent a linear or branched alkyl radical comprising from 1 to 4 carbon atoms, $R^4$ which can optionally be engaged in a ring, preferably $R^4$ is a methyl group,
- n" is a non-zero integer whereby the number-average molecular mass of the polyether block of formula —$[OR'^2]_{n''}$— ranges from 150 g/mol to 20,000 g/mol,
- p is an integer equal to 0 or 1 and,
- f is an integer equal to 2 or 3,
- the numbers n" and f are such that the number-average molecular mass of the polysilylated polymer(s) A) is at least 20,000 g/mol.

According to one embodiment, the polysilylated polymer(s) A) correspond(s) to the following formula: formula (II):

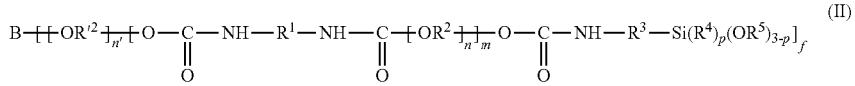
(II)

wherein:
- B represents a divalent hydrocarbonated radical (for f=2) or trivalent (for f=3) comprising from 2 to 66 carbon atoms, linear, branched, cyclic, alicyclic or aromatic, saturated or unsaturated, optionally comprising one or more heteroatoms, such as O, N,
- $R^1$ represents a divalent hydrocarbon radical comprising from 5 to 15 carbon atoms which can be aromatic or aliphatic, linear, branched or cyclic,
- $R^3$ represents a linear or branched divalent alkylene radical comprising from 1 to 6 carbon atoms,
- $R^2$ and $R'^2$, identical or different, each represent a linear or branched divalent alkylene radical comprising from 2 to 4 carbon atoms,
- $R^4$ and $R^5$, identical or different, each represent a linear or branched alkyl radical comprising from 1 to 4 carbon atoms, $R^4$ which can optionally be engaged in a ring, preferably $R^4$ is a methyl group,
- n is a non-zero integer whereby the number-average molecular mass of the polyether block of formula —$[OR^2]_n$— ranges from 300 g/mol to 40,000 g/mol,
- n' is a zero or non-zero integer whereby the number-average molecular mass of the polyether block of formula —$[OR'^2]_n$— ranges from 0 to 20000 g/mol,
- m is a zero or non-zero integer, preferably m is non-zero,
- p is an integer equal to 0 or 1 and,
- f is an integer equal to 2 or 3,
- the indices m, n, n' and f are such that the number-average molecular mass of the polysilylated polymer(s) A) is at least 20,000 g/mol.

According to one embodiment, the adhesive composition comprises a mixture of polysilylated polymer(s) A) of formula (I) and/or (II). Preferably, the adhesive composition comprises a mixture of polysilylated polymer(s) A) comprising at least one polysilylated polymer of formula (I) or (II) whereby p=0, and at least one polysilylated polymer of formula (I) or (II) whereby p=1. More preferably, the adhesive composition comprises a mixture of polysilylated polymer(s) A) comprising at least one polysilylated polymer of formula (II) whereby p=0, and at least one polysilylated polymer of formula (II) whereby p=1.

Preferably, the polysilylated polymer(s) A) is (are) disilylated.

Preferably, the number-average molecular mass of the polysilylated polymer(s) A) ranges from 20,000 to 55,000 g/mol, preferably from 25,000 to 45,000 g/mol, more preferably from 30,000 to 40,000 g/mol.

Secondly, the subject of the present invention is an adhesive composition comprising:
A) at least 20% by weight of at least one polysilylated polymer A) corresponding to one of formulae (I) or (II), or mixture thereof, and
B) at least 15% by weight of at least one tackifying resin selected from:
  (i) resins obtained by polymerization or copolymerization, optionally by hydrogenation, of unsaturated aliphatic and/or aromatic hydrocarbon mixtures having approximately 5, 9 or 10 carbon atoms derived from petroleum fractions;
  (ii) resins obtained by a process comprising the polymerization of alpha-methyl styrene or the copolymerization of alpha-methyl-styrene with other hydrocarbon monomers;
  (iii) rosins of natural origin or modified rosins, for example, rosin extracted from pine gum, wood rosin extracted from tree roots and hydrogenated derivatives thereof, dimerised, polymerized or esterified with monoalcohols or polyalcohols, such as glycerol or pentaerythritol; and
  (iv) mixtures thereof,
C) at least 0.2% by weight of at least one crosslinking catalyst, the % by weight contents being based on the total weight of the adhesive composition, and the sum of the contents of all the ingredients of the adhesive composition being equal to 100%.

According to one embodiment, the number-average molecular mass of the polysilylated polymer(s) A) ranges from 20,000 to 55,000 g/mol, preferably from 25,000 to 45,000 g/mol, more preferably from 30,000 to 40,000 g/mol.

According to one embodiment, the tackifying resin(s) B) is (are) selected from type (i) tackifying resins or tackifying resin mixtures comprising at least one type (i) and/or (ii) tackifying resin.

The third purpose of the present invention is a self-adhesive article comprising a support layer coated with a self-adhesive layer, said self-adhesive layer consisting of an adhesive composition according to the invention in cross-linked state.

According to one embodiment, the self-adhesive article is a self-adhesive multilayer system, and in particular a self-adhesive label or tape.

The fourth purpose of the present invention is a product coated at its surface with a self-adhesive article according to the invention, said surface preferably having a surface energy of less than or equal to 40 mN/m, preferably from 23 to 38 mN/m, more preferably from 25 to 35 mN/m, said surface energy being measured at 23° C., at 50% relative humidity, at atmospheric pressure of 1 bar, in air.

According to one embodiment, the surface of the product coated with a self-adhesive article according to the invention is plastic-based, preferably polyolefin type, such as polyisoprene (PI), polyisobutylene (PIB), polyethylene (PE) polypropylene (PP) and their copolymers, and in particular HDPE and PP.

The surface of the product coated with a self-adhesive article according to the invention can also be based on cyclic olefin polymer(s) like that obtained by ring opening metathesis (ROMP).

DETAILED DESCRIPTION OF THE EMBODIMENTS OF THE INVENTION

In the present patent application, unless indicated otherwise:
- viscosity is measured at 23° C. using a Brookfield RTV viscometer, with a needle and a rotational speed adapted to the sensitivity of the sensor.
- the number-average molecular mass of the tackifying resins (expressed in g/mol or in daltons) can be determined by methods that are well known to the person skilled in the art, for example by size exclusion chromatography (GPC), using for example, a polystyrene standard.
- the number-average molecular mass of the polysilylated polymers (expressed in g/mol or in daltons) can be determined by methods well known to the person skilled in the art, for example by 1H/13C NMR and/or by calculating the molar amounts of reagents used and/or size exclusion chromatography (GPC), using for example, a polystyrene standard.
- the hydroxyl number represents the number of hydroxyl functions per gram of tackifying resin, and is expressed in the present application in the form of the equivalent number of milligrams of potash per gram of tackifying resin (mg KOH/g) for the determination of the hydroxyl functions,
- the surface energy of a material or substrate is measured at 23° C., at 50% relative humidity, at atmospheric pressure of 1 bar, in air,
- the adhesive force (or peel strength) is measured by peel test at 1800 as described in the examples. The reference test is the Finat 1 standard, the application time of the product on the medium to be tested is 20 minutes, and the weight per unit area of glue deposited is 50 g/m$^2$,
- the polysilylated polymer A) is a polymer as described below having at least two hydrolysable silyl groups,
- the terms "lower" or "higher", not followed by the word "or equal", mean "strictly lower" and "strictly higher" respectively,
- the different embodiments described in the present application can be taken alone or in combination.

Adhesive Composition
Polysilylated Polymer A)

The adhesive composition according to the invention comprises at least one polysilylated polymer A) (each) having a number-average molecular mass (Mn) of at least 20,000 g/mol, and selected from polymers comprising a polyether-type main chain and/or polyurethane and at least two hydrolysable silylated end groups, said silylated end groups being attached to the main chain of the polymer by a urethane and/or ether function.

According to a first embodiment of the polysilylated polymer A), the polysilylated polymer A) is of polyether type having at least two ends each connected to a hydrolysable silylated terminal group by an ether function. According to this embodiment, the polysilylated polymer A) can be obtained by a preparation process comprising:
- in a first step, the preparation of a polyether having at least two allyl ether end groups (—O—CH$_2$—CH=CH$_2$) then
- in a second step, the reaction of said polyether obtained at the end of the first step with at least one silane having an SiH group, in sufficient quantity to react each of the polyether terminal groups —O—CH$_2$—CH=CH$_2$ with the silane SiH group by hydrosilylation in the presence of a platinum catalyst, the number-average molecular mass (Mn) of the polyether obtained at the end of the first step to be sufficiently high to obtain a desired Mn polysilylated polymer A) after reaction with the compound silane.

According to a second embodiment of the polysilylated polymer A), the polysilylated polymer A) is of polyurethane type having at least two ends each connected to a hydrolysable silylated terminal group by a urethane function. According to this embodiment, the polysilylated polymer A) can be obtained by a preparation process comprising:
- in a first step, the preparation of a polyurethane having at least two terminal OH groups, then
- in a second step, the reaction of said polyurethane with at least one isocyanatosilane having an NCO group, in sufficient quantity to react each of the polyurethane OH end groups with NCO group of an isocyanatosilane, the number-average molecular mass (Mn) of the polyurethane obtained after the first step to be sufficiently high to obtain a desired Mn polysilylated polymer A) compound after reaction with the isocyanatosilane.

The polyurethane having at least two OH end groups can be obtained in a manner well known to the person skilled in the art, by polyaddition of a stoichiometric excess of at least one polyether polyol with at least one diisocyanate. Preferably, the polyether polyol is a polyether diol.

In the first step, it is also possible to add, in admixture with the polyether polyol(s), at least one chain extender containing two groups each independently selected from each other from OH and primary and secondary amines. The chain extender is different from the polyether(s) polyol(s)

used for the preparation of polyurethane and generally has a molar mass of less than 300 g/mol.

The amounts of polyether polyol(s), diisocyanate(s) and, where appropriate, chain extender(s) used are adjusted in a manner well known to the person skilled in the art in order to obtain at the end of the first step, a polyurethane with two OH end groups, these amounts further being such that the molar ratio of the number of NCO functions to the total number of OH functions added with the primary and secondary amine functions optionally present (denoted r2.1) is strictly less than to 1.

The amount of isocyanatosilane used is adjusted in a manner well known to the person skilled in the art in order to obtain at the end of the second step, a polysilylated polymer A), this amount being such that the molar ratio of the number of NCO functions to the total number of OH functions, primary or secondary amine optionally present (denoted r2.2) is close to 1, meaning between 0.95 and 1.05.

The preparation of the polysilylated polymer A) is preferably carried out in the presence of at least one reaction catalyst. In particular, any catalyst capable of accelerating the reaction rate(s) described above and occurring in the first step and/or the second step of the above-described preparation process can be used.

According to a third embodiment of the polysilylated polymer A), the polysilylated polymer A) is of polyether type having at least two ends, each connected to a hydrolysable silylated terminal group by a urethane function. According to this embodiment, the polysilylated polymer A) can be obtained by reacting at least one polyether polyol with at least one isocyanatosilane having an NCO group, in an amount sufficient to imply the reaction of each of the OH end groups of the polyether polyol with NCO group of an isocyanatosilane, the number-average molecular mass (Mn) of the polyether polyol used to be sufficiently high to obtain a desired Mn polysilylated polymer A) after reaction with the isocyanatosilane.

It is also possible to add, in admixture with the polyether polyol(s), at least one chain extender as previously described.

The amount of isocyanatosilane used is adjusted in a manner well known to the person skilled in the art in order to obtain a polysilylated polymer A), this amount being such that the molar ratio of the number of NCO functions to the total number of OH functions, primary or secondary amine optionally present (denoted r3) is close to 1, meaning between 0.95 and 1.05.

The preparation of the polysilylated polymer A) is preferably carried out in the presence of at least one reaction catalyst. In particular, any catalyst capable of accelerating the reaction rate occurring in the above-described preparation process can be used.

Preferably, the polysilylated polymer(s) A) correspond(s) to one of the following formulae:

formula (I):

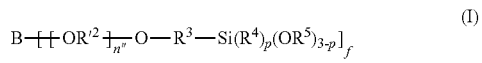

wherein:
B represents a divalent hydrocarbonated radical (for f=2) or trivalent (for f=3) comprising 2 to 66 carbon atoms, linear, branched, cyclic, alicyclic or aromatic, saturated or unsaturated, optionally comprising one or more heteroatoms, such as O, N, $R^3$ represents a linear or branched divalent alkylene radical comprising from 1 to 6 carbon atoms, $R'^2$ represents a linear or branched divalent alkylene radical comprising from 2 to 4 carbon atoms, $R^4$ and $R^5$, identical or different, each represent a linear or branched alkyl radical comprising from 1 to 4 carbon atoms, $R^4$ which can optionally be engaged in a ring, preferably $R^4$ is a methyl group, n" is a non-zero integer whereby the number-average molecular mass of the polyether block of formula —[OR'$^2$]$_{n"}$— ranges from 150 g/mol to 20,000 g/mol, p is an integer equal to 0 or 1 and, f is an integer equal to 2 or 3, the numbers n" and f are such that the number-average molecular mass of the polysilylated polymer(s) A) is at least 20,000 g/;

formula (II):

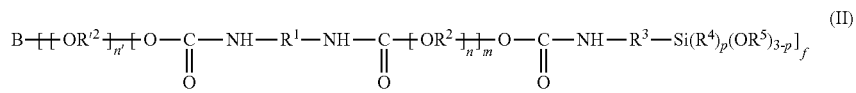

wherein:
B represents a divalent hydrocarbonated radical (for f=2) or trivalent (for f=3) comprising 2 to 66 carbon atoms, linear, branched, cyclic, alicyclic or aromatic, saturated or unsaturated, optionally comprising one or more heteroatoms, such as O, N, $R^1$ represents a divalent hydrocarbonated radical comprising from 5 to 15 carbon atoms which can be aromatic or aliphatic, linear, branched or cyclic, $R^3$ represents a linear or branched divalent alkylene radical comprising from 1 to 6 carbon atoms, $R^2$ and $R'^2$, identical or different, each represent a linear or branched divalent alkylene radical comprising from 2 to 4 carbon atoms, $R^4$ and $R^5$, identical or different, each represent a linear or branched alkyl radical comprising from 1 to 4 carbon atoms, $R^4$ which can optionally be engaged in a ring, preferably $R^4$ is a methyl group, n is a non-zero integer whereby the number-average molecular mass of the polyether block of formula —[OR$^2$]$_n$— ranges from 300 g/mol to 40,000 g/mol, n is a zero or non-zero integer whereby the number-average molecular mass of the polyether block of formula —[OR'$^2$]$_n$— ranges from 0 to 20000 g/mol, m is a zero or non-zero integer, p is an integer equal to 0 or 1 and, f is an integer equal to 2 or 3, the indices m, n, n' and f are such that the number-average molecular mass of the polysilylated polymer (s) A) is at least 20,000 g/mol.

In formulae (I) and/or (II), preferably:

R$^2$ and/or R'$^2$ identical or different, each represent a linear or branched divalent propylene radical, such as a divalent isopropylene radical, n is an integer whereby the number-average molecular mass of the polyether block of formula —[OR$^2$]$_n$— ranges from 6,000 to 25,000 g/mol, and/or n' is an integer whereby the number-average molecular mass of the polyether block of formula —[OR'$^2$]$_{n'}$— ranges from 0 to 12,500 g/mol.

More preferably,

R$^2$ and/or R'$^2$ identical are each a divalent isopropylene radical, n is an integer whereby the number-average molecular mass of the polyether block of formula —[OR$^2$]$_n$— ranges from 8,000 to 20,000 g/mol, and n' is an integer whereby the number-average molecular mass of the polyether block of formula [OR'$^2$]$_{n'}$— ranges from 0 to 10,000 g/mol.

Preferably, R$^3$ represents a linear or branched divalent alkylene radical comprising from 1 to 3 carbon atoms, and more preferentially a divalent methylene or n-propylene radical.

Preferably, R$^4$ represents a methyl radical, when p is equal to 1.

Preferably, R$^5$ represents a methyl or ethyl radical.

According to one embodiment, the adhesive composition comprises a mixture of polysilylated polymer(s)) A) of formula (I) and/or (II). Preferably, the adhesive composition comprises a mixture of polysilylated polymer(s) A) comprising at least one polysilylated polymer of formula (I) or (II) whereby p=0, and at least one polysilylated polymer of formula (I) or (II) whereby p=1. More preferably, the adhesive composition comprises a mixture of polysilylated polymer(s) A) comprising at least one polysilylated polymer of formula (II) whereby p=0, and at least one polysilylated polymer of formula (II) whereby p=1.

Preferably, m is non-zero.

Preferably, the polysilylated polymer(s) A) is (are) disilylated.

More preferentially, the polysilylated polymer(s) A) corresponds to formula (II) and is (are) preferably disilylated (f=2), with m being non-zero, and p=1.

Preferably, the polysilylated polymer(s) A) contain a number-average molecular mass (Mn) ranging from 20,000 to 55,000 g/mol, preferably from 25,000 to 50,000 g/mol, more preferably from 30,000 to 45,000 g/mol.

The content of polysilylated polymer(s) A) preferably represents at least 20% by weight, more preferably 20 to 84.8% by weight, more preferably 25 to 74.8% by weight, and better still 30 to 64.8% by weight, of the total weight of the adhesive composition.

The processes for preparing the above-described polysilylated polymers A) are carried out under anhydrous conditions, in order to avoid the hydrolysis of the hydrolysable silylated groups. Likewise, the use of these polymers is preferably carried out under such conditions.

Tackifying Resin B)

The tackifying resins B) that suitable for use in the adhesive composition according to the invention are compatible with the polysilylated polymer(s) A).

"Compatible tackifying resin" refers to a tackifying resin which, when mixed in the proportions 50%/50% by weight with the polysilylated polymer(s) A) produces a substantially homogeneous mixture.

Preferably, the tackifying resin(s) B) (each) contains a hydroxyl number less than or equal to 50, more preferably substantially close to zero, and more preferably equal to zero.

The tackifying resin(s) B) preferably (each) contains a softening point ranging from 0° C. to 140° C., more preferably from 50° C. to 130° C., more preferably between 70 and 120° C.

The tackifying resin(s) B) preferably has a number-average molecular mass ranging from 100 to 6000 g/mol, preferably from 300 to 4000 g/mol.

Preferably, the tackifying resin(s) is (are) selected from:

(i) resins obtained by polymerization or copolymerization, optionally by hydrogenation, of unsaturated aliphatic and/or aromatic hydrocarbon mixtures having approximately 5, 9 or 10 carbon atoms derived from petroleum fractions;

(ii) resins obtained by a process comprising the polymerization of alpha-methyl styrene or the copolymerization of alpha-methyl-styrene with other hydrocarbon monomers;

(iii) resins of natural origin or modified rosins, for example, rosin extracted from pine gum, wood rosin extracted from tree roots and hydrogenated derivatives thereof, dimerised, polymerized or esterified with monoalcohols or polyalcohols, such as glycerol or pentaerythritol; and (iv) mixtures thereof.

According to a preferred embodiment, the tackifying resin B) is a type (i) tackifying resin or a mixture of tackifying resins comprising at least one type (i) and/or (ii) tackifying resin. More preferably, the tackifying resin B) is a tackifying resin mixture comprising at least one type (i) and/or (ii) tackifying resin. In particular, it has been observed that the use of a tackifying resin mixture comprising at least one type (i) resin, and preferably a mixture comprising at least one type (i) and (ii) resin, according to this embodiment, led to improved adhesive performance, in particular, at least on PP.

Such resins are commercially available. For example, the following products can be mentioned:

type (i) resins: PICCO® AR-100 (available from EASTMAN) which is obtained by polymerization of aromatic hydrocarbon mixtures primarily containing 9 carbon atoms derived from petroleum fractions, having a zero IOH, a number-average molecular mass of 600 g/mol and a softening point of 100° C. or PICCO® AR-85 resin (available from EASTMAN) which is obtained by polymerization of aromatic hydrocarbon mixtures primarily containing 9 carbon atoms from petroleum fractions, having a zero IOH, a number-average molecular mass of 520 g/mol and a softening point of 85° C., or NORSOLENE® M1090 resin (available from the CRAY VALLEY company) which is an aromatic modified aliphatic resin having a zero IOH and a softening point of 90° C. or the PICCO® A-10 resin (available from EASTMAN) with a molecular weight of 420 g/mol and liquid at ambient temperature;

type (ii) resins: NORSOLENE® W110 (available from CRAY VALLEY), which is obtained by polymerization of alpha-methyl styrene without the action of phenols, having a zero IOH, with a number-average molecular mass of 750 g/mol and a softening point of 110° C.; NORSOLENE® W85 (available from CRAY VALLEY) corresponding to an alpha-methyl styrene resin, having a zero IOH, a number-average molecular mass of about 600 g/mol and a softening point of 85° C.;

type (iii) resins: SYLVALITE® RE 100 (available from ARIZONA CHEMICAL) which is a rosin and pentaerythritol ester, having an IOH of 50 mg KOH/g, with a number molecular weight of 974 g/mol, and with a softening point of 100° C.

Tackifying resin(s) B) content preferably represents at least 15% by weight of the total weight of the adhesive composition according to the invention, more preferably it represents from 15 to 79.8% by weight, more preferably still, 25 to 74.8% by weight, and more preferably 35 to 69.8% by weight, of the total weight of the adhesive composition.

Crosslinking Catalyst C)

The crosslinking catalyst(s) (C) recommended for use in the composition according to the invention can be any catalyst known to the person skilled in the art for silanol condensation. Examples of such catalysts are organic titanium derivatives such as titanium acetyl acetonate (commercially available under the name TYZOR)® AA75 from DuPont), aluminium such as aluminium chelate (commercially available under the name K-KAT® 5218 from KING INDUSTRIES), amines such as 1,8-diazobicyclo (5.4.0) undecene-7 or DBU.

The content of crosslinking catalyst(s) C) is preferably from 0.2 to 4% by weight of the total weight of the adhesive composition.

According to a preferred embodiment, the adhesive composition according to the invention comprises:
from 20 to 84.8% by weight of one or more polysilylated polymers A),
from 15 to 79.8% by weight of one or more tackifying resins B), and
from 0.2 to 4% by weight of at least one crosslinking catalyst C), with respect to the total weight of the adhesive composition.

According to an even more preferred embodiment, the adhesive composition according to the invention comprises:
from 25 to 74.8% by weight of one or more polysilylated polymers A),
from 25 to 74.8% by weight of one or more tackifying resins B), and
from 0.2 to 4% by weight of at least one crosslinking catalyst C), with respect to the total weight of the adhesive composition.

According to an even more preferred embodiment, the adhesive composition according to the invention comprises:
from 30 to 64.8% by weight of one or more polysilylated polymers A),
from 35 to 69.8% by weight of one or more tackifying resins B), and
from 0.2 to 4% by weight of at least one crosslinking catalyst C), The adhesive composition according to the invention can or cannot include, in combination with polysilylated polymer(s) A), at least one thermoplastic polymer selected from those used in the preparation of HMPSA, such as Ethylene Vinyl Acetate (EVA) or styrenic block copolymers (such as SIS, SBS, SIBS, SEBS, SEPS, and derivatives thereof grafted with in particular maleic anhydride). These thermoplastic polymers are not silylated.

The adhesive composition according to the invention can furthermore comprise at least one hydrolysable, non-polymeric alkoxysilane derivative with a molar mass of less than 500 g/mol, as a drying agent, and preferably a trimethoxysilane derivative. Such an agent advantageously prolongs the shelf life of the adhesive composition according to the invention during storage and transport, prior to use. Mention can be made, for example, of gamma-methacryloxypropyltrimethoxysilane available under the trade name SILQUEST® A-174 from MOMENTIVE. The content of drying agent(s) up to 3% by weight of the weight of the adhesive composition.

The composition according to the invention can also include at least one plasticizer such as a phthalate or a benzoate, a paraffinic and naphthenic oil (such as Primol® 352 from ESSO) or a polyethylene homopolymer wax (like AC® 617 from HONEYWELL), or a polyethylene copolymer wax and vinyl acetate, or pigments or dyes, or a mixture of these compounds.

The adhesive composition according to the invention can or cannot include fillers. The filler content preferably represents less than 15% by weight, more preferably less than 10% by weight, and more preferably still less than 1% by weight, of the weight of the adhesive composition.

Finally, a quantity of 0.1 to 2% of one or more stabilizers (or antioxidants) is preferably included in the adhesive composition according to the invention. These compounds are introduced to protect the composition from degradation resulting from a reaction with oxygen that is likely to be formed on exposure to heat or light. These compounds can include primary antioxidants that trap free radicals and are especially substituted phenols such as CIBA Irganox® 1076. The primary antioxidants can be used alone or in combination with other secondary antioxidants or UV stabilizers.

The adhesive composition according to the invention can be prepared by a process comprising:
a step of mixing polysilylated polymer(s) A), with tackifying resins B), in an air-tight atmosphere, preferably in an inert or vacuum atmosphere, at a temperature ranging from 40 to 170° C., preferably from 70 to 150° C., then
a step of incorporating into said mixture at least one crosslinking catalyst C) at a temperature ranging from 40 to 90° C. and, if applicable, at least one desiccating agent and one or many other optional components as described above.

The adhesive composition according to the invention can be used for manufacturing a self-adhesive article, comprising a temporary or permanent support layer and an adhesive layer, said adhesive layer being obtained by crosslinking the adhesive composition.

The support layer of the self-adhesive article obtained from the adhesive composition according to the invention can be a temporary or permanent support layer.

In the case where the support layer is a temporary support, the support layer is preferably a plastic film or release liner. In this case, once the product is glued to a surface, the glued product comprises only an adhesive layer, the temporary medium being intended to be removed.

"Anti-adherent" refers to a material on which the adhesive composition according to the invention in the crosslinked state has an adhesive force of less than 200 centipoise per centimetre (cN/cm), and preferably less than 50 cN/cm or even more preferably less than 30 cN/cm or more preferably less than 10 cN/cm. This value is measured according to the FINAT 3 test carried out at a pulling speed of 300 mm/min and a pulling angle of 180°.

The non-stick coating generally has a surface energy of less than or equal to 22 mN/m, more preferably less than 20 mN/m.

In the case where the support layer is a permanent support layer, the support layer can be based on any materials usable for manufacturing pressure sensitive articles or PSA article.

Self-Adhesive Article

The present invention also relates to a self-adhesive article comprising a support layer coated with a self-adhesive layer, said self-adhesive layer consisting of an adhesive composition according to the invention in crosslinked state.

For the purposes of the present invention, the term "self-adhesive article" includes any article that can be adhered to a surface only under manual or mechanical pressure, without the use of additional glues or adhesives. The term "self-adhesive article" also includes the term "Pressure Sensitive Adhesive Article" or "PSA product". These products are intended to be applied to a surface to be glued in order to bond, maintain, affix, or simply to immobilize, expose shapes, logos, images or information. These products can be used in many fields, such as the medical, clothing, packaging, automotive or construction fields. They can be shaped according to their final application, for example in the form of tape, such as tape for industrial use, do-it-yourself or construction site tapes, single or double-sided tape, or in the form of labels, bandages, dressings, patches or graphic films.

According to one embodiment, the self-adhesive article is a self-adhesive multilayer system, and in particular a self-adhesive label or tape, which can be single-sided or double-sided.

The support layer is sufficiently flexible to be able to be wound and conditioned in the form of a coil, for example as described above.

Preferably, the support layer has an elongation at break greater than zero and strictly less than 100%. More preferably, the support layer has an elongation at break less than or equal to 50%, and even more preferably less than or equal to 40%. More preferably, the support layer has an elongation at break of less than or equal to 30%.

The elongation at break can be measured according to ISO 1926 at 23° C., lengthwise or width-wise. Preferably, elongation at break is measured lengthwise.

The support layer can for example, be based on acrylic polymers, polyethylene (PE), oriented, non-oriented or bi-oriented, polypropylene (PP), polyimide, polyurethane, polyester such as polyethylene terephthalate (PET), or paper.

Preferably, the support layer has a Young's modulus strictly greater than 300 MPa, more preferably greater than or equal to 400 MPa, and more preferably greater than or equal to 500 MPa.

According to one embodiment, the self-adhesive article obtained from the adhesive composition according to the invention comprises a permanent support layer coated with an adhesive layer. Preferably, the adhesive layer is further coated with a plastic film or non-stick protective paper, preferably silicone.

As an alternative to the non-stick protective film, the rear surface of the permanent support layer which is not coated with the adhesive layer can have a non-stick surface, for example a silicone release liner.

The two embodiments described above allow the self-adhesive article to be wound up and then unrolled without adhesive transfer issued between the adhesive layer and the permanent support layer.

According to one embodiment, the permanent support layer is coated on both sides with an adhesive composition, which can be identical or different, at least one of the two adhesive compositions being according to the invention.

Preferably, the support layer has a thickness ranging from 10 microns to 50 mm, more preferably from 10 microns to 20 mm, preferably from 20 microns to 10 mm, more preferably from 20 microns to 1 mm.

In some cases, it is necessary to carry out a surface treatment of the support layer to increase the adhesion of the adhesive layer during the coating step thereon, especially when the support layer and the surface of the substrate for bonding have the same surface energy.

The self-adhesive article according to the invention can be applied to the surface of a low-surface-energy substrate that has not undergone surface pre-treatments. These pre-treatments are intended to chemically and/or physically modify said surface, to increase surface energy and/or roughness of said surface, and thus improve the adhesion of the adhesive layer on said surface. Examples of known surface treatments include a plasma or corona treatment, an abrasion or the application on said surface of a chemical anchoring agent (also called primary) capable of imparting a higher surface energy to the substrate coated with said agent.

The self-adhesive article according to the invention can thus bond two substrates, at least one of which has a low surface energy.

The substrate on which the self-adhesive article is intended to be applied (referred to as a "sticky substrate") can be flexible or rigid.

In particular, it can have the same flexibility properties as the support layer described above, in order to be wound and conditioned in the form of a coil, for example as described above.

Alternatively, the substrate to be bonded can be rigid. In this case, the substrate cannot be wound and conditioned in the form of a coil, for example as described above, without becoming brittle.

The substrate to be bonded can be selected from low-surface-energy substrates, such as polyolefin substrates, which are organic apolar substrates; or organic apolar coatings such as varnishes, inks or paints; said substrates having a surface energy of less than or equal to 40 mN/m, preferably from 23 to 38 mN/m, more preferably from 25 to 35 mN/m.

Polyolefin substrates, for example, monomer and comonomer based polymeric materials such as polyethylene (PE), polypropylene (PP), polyisoprene (PI), polyisobutylene (PIB), and their copolymers (blocks or statistics), or based on cyclic olefin(s) polymer(s) as obtained by ring opening metathesis (ROMP), or mixtures of these polymers.

Examples of polyethylene (PE), include in particular, high density polyethylene (HDPE), low density polyethylene (LDPE), linear low density polyethylene and ultra-low linear density polyethylene.

Owing to the adhesive properties of the adhesive obtained by crosslinking the adhesive composition according to the invention, the self-adhesive article according to the invention can bond to a low-surface-energy substrate, in particular plastic-based, preferably polyolefin base, such as PE and PP, and in particular HDPE and PP, with an adhesion strength of at least 4N/cm.

In particular, the self-adhesive article according to the invention can stick on a PP-based substrate, with an adhesion strength of at least 5N/cm.

According to one embodiment of the invention, the self-adhesive article further comprises a release liner.

According to one embodiment, said non-stick coating is applied to the adhesive layer, after crosslinking of the adhesive composition.

The support layer can be covered on one of its two surfaces, the rear surface not coated with the adhesive layer, by a non-adherent release liner, for example by a silicone film. This way, the self-adhesive article can be wound on itself and unrolled without issues thanks to the absence of adhesion of the adhesive layer on the silicone face.

The self-adhesive article according to the invention is obtainable by the method comprising the following steps:
(a) conditioning the adhesive composition according to the invention as defined above at a temperature ranging from 20 to 130° C.; then
(b) coating the adhesive composition obtained in step (a) with a carrying surface; then
(c) crosslinking the coated adhesive composition by heating at a temperature ranging from 20 to 200° C. in a gaseous environment where water molecules are present between 10 and 200 mg per $m^3$ gas;
(d) lamination or transfer of the crosslinked adhesive layer onto a support layer or onto a non-stick protective film, said support layer or non-adhering film being able to be the reverse side of the carrying surface.

"Carrying surface" within the context of the present invention refers either to a conveyor belt covered with a non-stick coating, a release liner or a support layer. Thus, the carrying surface is made to become part of the self-adhesive article, either as a non-stick protective film or as a support layer.

In the case where the carrying surface is not a support layer, the method for obtaining the self-adhesive article according to the invention comprises the step (d) of transfer of the crosslinked adhesive layer on a support layer.

In the case where the carrying surface is a support layer, the process for obtaining the self-adhesive article according to the invention can comprise the step (d) of bonding the adhesive layer on a non-stick protective film.

According to a preferred variant of the invention, step (d) of the above-described method consists of a transfer of the crosslinked adhesive layer onto a flexible support layer (which can be a plastic film) after cooling the crosslinked adhesive layer to a temperature below the degradation or softening temperature of the material forming the support layer. According to this variant, it is possible to manufacture a self-adhesive article comprising a support layer made of a temperature-sensitive material, for example a polyolefin-based material, as mentioned above.

According to one embodiment, the self-adhesive article according to the invention can be obtained by the process as described above, not including a step of pretreatment of the support layer surface. These pre-treatments are intended to chemically and/or physically modify said surface, to increase surface energy and/or roughness of said surface, and thus improve the adhesion of the adhesive layer on said surface. Examples of known surface treatments include a plasma, corona treatment, an abrasion or the application on said surface of a chemical anchoring agent (also called primary) capable of imparting a high surface energy to the substrate coated with said agent.

According to one embodiment of the invention, the adhesive layer as described above has an adhesion strength on substrates of different surface energies of at least 4 N/cm.

In particular, a self-adhesive article consisting of a support layer of PolyethyleneTerephthalate (PET) 50 µm thick, coated with an adhesive layer according to the invention, at a weight per unit area of 50 $g/m^2$, has a permanent adhesion on HDPE or PP corresponding to an adhesive power (measured by the 180° peel test (performed according to Finat 1 standard) advantageously of 4 at 15 N/cm.

Said adhesion force can be measured after an application time of the self-adhesive article on a defined surface low-surface-energy substrate capable of lasting up to a few minutes, a few hours, or several days, such as illustrated especially in the examples.

According to one embodiment, the process of manufacturing the self-adhesive article according to the invention further comprises a step (e) of coating a second layer of adhesive composition according to the invention on the support layer followed by a step (f) of crosslinking the adhesive composition coated in step (e) by heating at a temperature ranging from 20 to 200° C. According to this embodiment, a double-sided self-adhesive article is obtained.

The coating step (b) can be carried out using known coating devices, for example a lip or curtain-type nozzle, or by roller. It processes an adhesive composition weight per unit area ranging from 3 to 2000 $g/m^2$, preferably from 5 to 1000 $g/m^2$, more preferably from 10 to 500 $g/m^2$ or more preferably from 12 to 250 $g/m^2$.

The weight per unit area of the adhesive composition required for manufacturing self-adhesive labels can range from 10 to 100 $g/m^2$ preferably 20 to 50 $g/m^2$. That required for manufacturing self-adhesive tapes can vary in a much wider range from 3 to 500 $g/m^2$ preferably from 15 to 250 $g/m^2$ per surface.

According to one embodiment, the coated adhesive composition is further subjected, during step (c) to a treatment in a humid atmosphere according to its moisture level. Preferably, the humid atmosphere is an atmosphere wherein from 2 to 100% of the molecules are water molecules, preferably from 4 to 50%, more preferably from 5 to 10% of the molecules are water molecules.

The moisture content is expressed as a percentage of water per unit volume, which is the number of water molecules divided by the total number of molecules in a unit volume. Due to the linear nature of this scale, the moisture content is easily measured and controlled using, for example, PID monitors ("Proportional-Integral-Derivative"). The percentage by weight can be calculated by multiplying the percentage of the number of water molecules with respect to the total number of molecules by a factor of 0.622. General information on moisture levels in various environments is described by W. Wagner et al., In "*International Steam Tables—Properties of Water and Steam Based on the Industrial Formulation IAPWS-IF97*".

The time required for the crosslinking of step (c) can vary within wide limits, for example between 1 second and 30 minutes, depending on the weight per unit area of adhesive composition deposited on the support surface, the heating temperature, and moisture.

This thermal crosslinking step has the effect of creating—between the polymer chains of the polysilylated polymer(s) A) as described above and under the action of moisture—of siloxane-type bonds which lead to the formation of a three-dimensional polymeric network. The resulting crosslinked adhesive composition is a pressure-sensitive adhesive which provides the coated carrier layer with the desired adhesive strength and tack.

Preferably, the coating is carried out uniformly on the support layer or on the non-stick release liner, but the coating can also be adapted to the desired shape of the final self-adhesive article.

According to one embodiment, the coating by the adhesive composition is performed on at least a portion of the two surfaces of the support layer. If both surfaces of the support layer are coated, the adhesive composition can be the same or different on both sides, and the weight per unit area can be the same or different on both sides.

According to one embodiment of the invention, the self-adhesive article comprises an adhesive layer on at least a part of a face or on at least a portion of the two surfaces of the support layer, said adhesive layer or layers possibly being coated with a non-stick release liner. According to one embodiment, the self-adhesive article comprises two non-stick protective layers on each of the two adhesive layers. In this case, the two protective layers can be identical or different materials and/or they can have the same or different thickness.

The self-adhesive article according to the invention can be used in a bonding method comprising the following steps:
- a) removing the non-stick release liner, when such a layer is present;
- b) applying the self-adhesive article to a surface of a product; and
- c) applying pressure on said product.

In step b), the self-adhesive article is applied so that the self-adhesive portion of the product (formed by the self-adhesive layer) faces the product surface.

According to an embodiment in which the self-adhesive article is a double-sided product, the bonding method further comprises a step wherein either a second surface of a product is applied to the product adhered to the first surface of the product, or the product adhered to the first surface of a product is applied to a second surface of a product.

Product Coated with Self-Adhesive Article

The third subject of the present invention is a product coated at its surface with a self-adhesive article according to the invention.

Preferably, said surface has not undergone surface pre-treatments as described above.

Preferably, said surface has a surface energy less than or equal to 40 mN/m, preferably ranging from 23 to 38 mN/m, more preferably ranging from 25 to 35 mN/m.

Preferably, said surface is smooth and homogeneous.

The surface of the product coated with a self-adhesive article according to the invention can be based on low-surface-energy substrates, such as polyolefin substrates, which are organic apolar substrates; or organic apolar coatings such as varnishes, inks or paints; said substrates having a surface energy of less than or equal to 40 mN/m, preferably from 23 to 38 mN/m, more preferably from 25 to 35 mN/m.

Polyolefin substrates, for example, monomer and comonomer based polymeric materials such as polyethylene (PE), polypropylene (PP), polyisoprene (PI), polyisobutylene (PIB), and their copolymers (blocks or statistics), or based on cyclic olefin(s) polymer(s) as obtained by ring opening metathesis (ROMP), or mixtures of these polymers.

Examples of polyethylene (PE), include in particular, high density polyethylene (HDPE), low density polyethylene (LDPE), linear low density polyethylene and ultra-low linear density polyethylene.

The surface of the product coated with a self-adhesive article according to the invention can be flexible or rigid.

In particular, the product to be coated can have the same flexibility properties as the support layer described above, in order to be wound and conditioned in the form of a coil, for example as described above.

Alternatively, the product to be coated cannot be wound and conditioned in the form of a coil, for example as described above, either because of its rigidity, shape or thickness.

The following examples are provided purely by way of illustration of the invention and should not be interpreted to limit its scope.

EXAMPLES

The following ingredients were used in the examples:

As disilylated polymer:
- PDS 1: Disilylated polymer having a number-average molecular mass of about 16,000 g/mol (or 20 kDa and an Ip of about 1.6 if determined by GPC), comprising a polyurethane-type main chain and two propylene-trimethoxysilane end groups hydrolysable, said silylated end groups being attached to the main chain of the polymer by a urethane function. This polymer corresponds in particular, to formula (I), but does not have an Mn greater than or equal to 20,000 g/mol.
- PDS2: A disilylated polymer having a number-average molecular mass of about 37,000 g/mol (or 38 kDa an Ip of about 1.9 if determined by GPC), comprising a polyurethane-type main chain and two hydrolysable propylene-trimethoxysilane end groups said silylated end groups being attached to the main chain of the polymer by a urethane function. This polymer corresponds in particular, to the formula (I) according to the invention.
- PDS3: GENIOSIL® STP-E 30 (available from Wacker): a disilylated polymer having a number-average molecular mass of about 18,500 g/mol (or 22 kDa and an Ip of about 1.2 if determined by GPC), comprising a main chain of polyether type and two hydrolysable methylene-trimethoxysilane terminal groups, said silylated end groups being attached to the main chain of the polymer by a urethane function. This polymer corresponds in particular, to formula (I), but does not have an Mn greater than or equal to 20,000 g/mol.
- PDS4: GENIOSIL® STP-E 35 (available from Wacker): a disilylated polymer with a number-average molecular mass of about 18,600 g/mol (or 22 kDa and an Ip of about 1.2 if determined by GPC), comprising a polyether-type main chain and two hydrolysable propylene-trimethoxysilane end groups, said silylated end groups being attached to the main chain of the polymer by a urethane function. This polymer corresponds in particular, to formula (I), but does not have an Mn greater than or equal to 20,000 g/mol.

Tackifying Resin:
- T1: SYLVALITE® RE 100 (available from ARIZONA CHEMICAL): Rosin ester pentaerythritol resin having an IOH of about 50 mg KOH/g, a number-average molecular mass of about 974 g/mol and a softening point of 100° C. (tackifying resin type (iii));
- T2: DERTOPHENE® H 150 (available from DRT): Phenolic terpene resin having an IOH of about 150 mg KOH/g, a number-average molecular mass of about 700 g/mol and a softening point of 120° C.;
- T3: NORSOLENE® W85 (available from CRAY VALLEY): alpha methyl styrene resin, having an IOH of 0, a number-average molecular mass of about 600 g/mol and a softening point of 85° C. (type (ii) tackifying resin);
- T4: NORSOLENE® W10 (available from CRAY VALLEY): alpha methyl styrene resin, having an IOH of 0, a number-average molecular mass of about 750 g/mol and a softening point of 110° C. (type (ii) tackifying resin);

T5: PICCO® AR 100 (available from EASTMAN): resin obtained by polymerization of aromatic hydrocarbon mixtures mainly comprising 9 carbon atoms derived from petroleum fractions, having an IOH of 0, a number-average molecular mass of 550 g/mol and a softening point of 100° C. (tackifying resin type (i)).

Crosslinking Catalyst:

K-KAT® 5218 (available from King Industries): contains an aluminium chelate.

I—Preparation of Disilylated Polymers:

PDS1 Synthesis (Comparative):

The following are introduced in a glass reactor:
961.2 g (0.1199 mol) of poly (oxypropylene) diol ACCLAIM® 8200,
12.99 g (0.0582 mol) of isophorone diisocyanate (IPDI), which corresponds to a NCO/OH functions molar ratio equal to 0.5; and:
0.29 g (corresponding to 300 ppm) of a bismuth and zinc neodecanoate catalyst (commercially available from Borchers, under the name Borchi Kat VP 0244).

This mixture is kept under constant stirring at 85° C. and under nitrogen for 3 hours, until complete reaction of the NCO functions of the IPDI.

To the hydroxyl terminated polyurethane thus obtained is then added 26.05 g (0.1269 moles) of gamma-isocyanato-n-propyl-trimethoxysilane and the mixture is maintained at 85° C. until complete disappearance of the NCO functions.

The polyurethane obtained has a viscosity of about 55 Pascal seconds (Pa·s.) (measured with Brookfield viscometer at 23° C., with a needle 7 rotating at 20 revolutions per minute (rpm)) and a number-average molecular mass of about 16,000 g/mol (or 20 kDa and a polymolecularity index of about 1.6 determined by GPC).

Synthesis of PDS2 (According to the Invention):

The following are introduced in a glass reactor:
884.63 g (0.0457 mole) of the poly (oxypropylene) diol ACCLAIM® 18200,
5.10 g (0.0229 mol) of isophorone diisocyanate (IPDI), which corresponds to a ratio of the number of NCO/OH functions equal to 0.5; and:
300 ppm of a bismuth and zinc neodecanoate type catalyst (commercially available from Borchers, under the name Borchi Kat VP 0244).

This mixture is kept under constant stirring at 85° C. and under nitrogen for 3 hours, until complete reaction of the NCO functions of the IPDI.

To the hydroxyl terminated polyurethane thus obtained is then added 10 g (0.0474 mole) of gamma-isocyanato-n-propyl-trimethoxysilane and the mixture is maintained at 85° C. until complete disappearance of the NCO functions.

The polyurethane obtained has a viscosity of 510 Pa·s. approximately (measured at Brookfield viscometer at 23° C., with a needle 7 rotating at 20 rpm) and a number-average molecular mass of about 37,000 g/mol (or 38 kDa an Ip of about 1.9 if determined by GPC).

II—Preparation of Adhesive Compositions

Adhesive compositions 1 and CE1 to CE7 were prepared following the same operating procedure described below, using the ingredients listed in table 1 below. The amounts of each ingredient used are indicated in percentage by weight based on the total weight of the adhesive composition.

Composition 1 corresponds to an adhesive composition according to the invention.

Compositions CE1 to CE7 correspond to comparative adhesive compositions. In particular:
compositions CE1 and CE2 correspond to the compositions of examples A of patent applications WO 09/106699 and EP 2 336 208 respectively, comprising a disilylated polymer of Mn less than 20,000 g/mol and a tackifying resin with an IOH greater than 100 mg KOH/g,
compositions CE3 to CE7 correspond to comparative compositions comprising a disilylated Mn polymer of less than 20,000 g/mol.

Operating Procedure:

The adhesive composition is prepared by first introducing the tackifying resin into a vacuum glass reactor and heated to about 140° C. Then, once the resin or resins are melted, the disilylated polymer is added.

The mixture is stirred under vacuum for 15 minutes and then cooled to 80° C. The catalyst is then introduced. The mixture is kept under vacuum and with stirring for another 10 minutes.

The viscosity of the mixture is then determined at 100° C., using a Brookfield type viscometer (equipped with the Thermosel system for high temperature viscosity measurements) equipped with a needle A28 rotating at a speed adapted to the sensitivity of the sensor. For example 1 according to the invention and the comparative examples, the mixtures have a viscosity ranging from 0.5 Pa·s. at 40 Pa·s., measured at 100° C.

II—Preparation of Self-Adhesive Articles

Each of the adhesive compositions 1 and CE1 to CE7 is used for manufacturing a self-adhesive article, following the operating procedure below.

Operating Procedure:

A rectangular PolyethyleneTerephthalate (PET) sheet 50 m thick and measuring 20 cm by 40 cm is used as the support layer.

The adhesive composition is preheated to a temperature close to 90° C. and introduced into a cartridge from which a cord which is deposited near the edge of the sheet parallel to its width is extruded.

The adhesive composition contained in this cord is then distributed over the entire surface of the sheet, in order to obtain a uniform layer with a substantially constant thickness. For this purpose, a film puller (also known as a filmograph) and is moved from the edge of the sheet to the opposite edge. Thus, a layer of adhesive composition corresponding to a weight per unit area of 50 g/m² is deposited, which represents a thickness of about 50 μm.

The PET sheet thus coated is then placed in an oven at 120° C. for 600 seconds to crosslink the composition, then laminated on a release liner consisting of another sheet of PET film, rectangular, of same dimensions and with a silicone surface to act as a non-stick surface.

The self-adhesive article thus obtained comprising the crosslinked adhesive layer on the PET support is subjected to the tests described below.

III—Adhesion Test of Self-Adhesive Articles

The self-adhesive articles prepared above are subjected to the following adhesion tests on two types of polyolefin substrates under the same conditions: HDPE and PP. The surface energy of these substrates in contact with the tested adhesive is 27 and 29 mN/m for HDPE and PP respectively. These values were determined from the measurement method described below.

Determination of the Surface Energy of the Substrates:

The surface energy of each of the substrates was determined by measuring the contact angle of standard solutions on the surface of said substrates. The substrates tested are HDPE or flat, smooth and homogeneous surface PP plates, 15 cm long and 2.5 cm wide. The contact angle was measured for three standard solutions (diiodomethane, ethylene glycol and water) with a Digidrop device equipped with a set of syringes for depositing standard solutions. The contact angle meter is connected to the Windrop++ software provided by GBX Scientific Instrument for calculating the surface energy of the substrate from the measured contact angle. The measurements were done in open air in a room at 23° C. with a relative humidity of 50%, under atmospheric pressure of 1 bar.

Preparation of the substrates: The substrate is attached on a glass plate 15 cm long and 5 cm wideusing a layer of double-sided adhesive tape of the same dimensions as the substrate and completely covering the surface of said substrate, by overlapping at least one of the corners of each of the layers formed by the substrate, the adhesive tape and the glass plate. The sample thus formed is smoothed to obtain a smooth surface and free of air bubbles. The sample is placed under the Digidrop so that the deposit syringes face the substrate surface of the sample and are aligned as close as possible to the edge of the sample.

Measurement of the contact angle: The Windrop++ software launches the deposition program that will simultaneously trigger the deposition of a drop of a standard solution and the automatic capture of a photo of the drop in contact with the surface of the substrate. The picture is taken at 13,000 milliseconds (ms) for water and ethylene glycol, and at 2000 ms for diiodomethane starting from program start. For each standard solution, three deposits are made. Between each deposit, the sample is manually moved so that the drops are deposited close to each other on the surface of the substrate, near the edge of the sample. The drop order is as follows: 3 drops of water, 3 drops of ethylene glycol, 3 drops of diiodomethane.

Calculation of the contact angle and determination of the surface energy of the substrate: From each shot taken, a contact angle is calculated using the "Manual 2" method. For each standard solution, three contact angle values are thus obtained. The surface energy of the substrate (EN1) is calculated by applying the Owen & Wendt model to the obtained contact angle values.

A second set of contact angle measurement is performed for each standard solution. As previously, the contact angles for 3 drops of each standard solution are measured in the above-mentioned order, and a second surface energy value (EN2) is deduced therefrom.

A third set of contact angle measurement is carried out for each standard solution, and a third surface energy value (EN3) is deduced therefrom.

The surface energy of the substrate is obtained by averaging the three values obtained: EN1, EN2 and EN3.

Peel Test at 180° on Polyolefin (HDPE, PP):

Adhesive power is evaluated by the peel test at 180° as described in FINAT method 1, published in the FINAT Technical Manual 6$^{th}$ edition, 2001, on polyolefin. FINAT is the international federation of manufacturers and processors of self-adhesive labels. The principle of this test is as follows.

A test sample in the form of a rectangular strip (25 mm×175 mm) is cut in the PET support layer coated with the crosslinked composition constituting the previously obtained self-adhesive article. This test sample is, after its preparation, stored for 24 hours at a temperature of 23° C. and in an atmosphere at 50% relative humidity. It is then attached on ⅔ of its length (after removal of the corresponding non-stick release liner portion) on a substrate consisting of a HDPE or PP plate. The assembly obtained is left for 20 minutes at room temperature (23° C.). It is then placed in a traction device capable, from the free end of the rectangular strip, of peeling or detaching the strip at an angle of 180° and with a separation speed of 300 mm per minute. The device measures the force required to detach the band under these conditions.

Results:

The results of the measurements are expressed in N/cm and indicated in table 2 below. It is observed that the adhesive composition of example 1 according to the invention makes it possible to obtain a self-adhesive article having an adhesive power superior to the comparative adhesive compositions of examples CE1 to CE7.

TABLE 1

|   |          | Ex 1 | CE1  | CE2  | CE3  | CE4  | CE5  | CE6  | CE7  |
|---|----------|------|------|------|------|------|------|------|------|
|(A)| PDS1     | —    | 53.7 | —    | 49.0 | 44.0 | —    | —    | 44.0 |
|   | PDS2     | 44.0 | —    | —    | —    | —    | —    | —    | —    |
|   | PDS3     | —    | —    | 53.7 | —    | —    | —    | 45.0 | —    |
|   | PDS4     | —    | —    | —    | —    | 44.0 | —    | —    | —    |
|(B)| T1       | —    | —    | —    | 24.6 | —    | —    | —    | 27.1 |
|   | T2       | —    | 44.7 | 44.7 | —    | —    | —    | —    | —    |
|   | T3       | —    | —    | —    | —    | —    | —    | —    | —    |
|   | T4       | 27.1 | —    | —    | 24.6 | 27.1 | 27.1 | 27.3 | 27.1 |
|   | T5       | 27.1 | —    | —    | —    | 27.1 | 27.1 | 27.2 | —    |
|(C)| catalyst | 1.8  | 1.6  | 1.6  | 1.8  | 1.8  | 1.8  | 0.5  | 1.8  |

TABLE 2

|                       |              | Ex1 | CE1 | CE2 | CE3 | CE4 | CE5 | CE6 | CE7 |
|-----------------------|--------------|-----|-----|-----|-----|-----|-----|-----|-----|
| Peel at 180° (N/cm)   | HDPE (≥4 N/cm) | 4.2 | 2.2 | 1.6 | 3.2 | 1.6 | 2.0 | 2.0 | 3.3 |
|                       | PP (≥5 N/cm)   | 7.6 | 1.2 | 0.8 | 2.8 | 3.6 | 3.6 | 3.6 | 4.0 |

The invention claimed is:

1. A self-adhesive article comprising an adhesive layer consisting of a crosslinked adhesive composition comprising:
A) at least one polysilylated polymer having a number-average molar mass (Mn) of at least 20000 g/mol, wherein the at least one polysilylated polymer comprises a polyether and/or polyurethane main chain and at least two hydrolysable silylated end groups, said silylated end groups being attached to the main chain of the polymer by a urethane or ether function (referred to as a connector group),
B) a tackifying resin mixture comprising at least one type (i) and (ii) tackifying resin, wherein each resin has a hydroxyl number less than or equal to 50 and wherein type (i) and type (ii) tackifying resins are defined as follows:
i. resins obtained by polymerization or copolymerization, optionally by hydrogenation, of unsaturated aliphatic and/or aromatic hydrocarbon mixtures having approximately 5, 9 or 10 carbon atoms derived from petroleum fractions; and
ii. resins obtained by a process comprising the polymerization of pure alpha-methyl styrene monomers; and
C) at least one crosslinking catalyst,
D) excluding any monosilylated polymer.

2. The self-adhesive article according to claim 1, wherein the at least one polysilylated polymer(s) A) correspond(s) to the following formula:
formula (I):

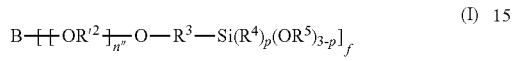

wherein:
B represents a divalent hydrocarbonated radical (for f=2) or trivalent (for f=3) comprising 2 to 66 carbon atoms, linear, branched, cyclic, alicyclic or aromatic, saturated or unsaturated, optionally comprising one or more heteroatoms,
$R^3$ represents a linear or branched divalent alkylene radical comprising from 1 to 6 carbon atoms,
$R'^2$ represents a linear or branched divalent alkylene radical comprising from 2 to 4 carbon atoms,
$R^4$ and $R^5$ identical or different, each represent a linear or branched alkyl radical comprising from 1 to 4 carbon atoms, $R^4$ which can optionally be engaged in a ring,
n" is a non-zero integer whereby the number-average molecular mass of the polyether block of formula $-[OR'^2]_{n''}$-ranges from 150 g/mol to 20,000 g/mol,
p is an integer equal to 0 or 1,
f is an integer equal to 2 or 3, and
the numbers n" and f are such that the number-average molecular mass of the at least one polysilylated polymer(s) A) is as defined in claim 1.

3. The self-adhesive article according to claim 2, wherein the polysilylated polymer(s) A) is (are) disilylated (f=2).

4. The self-adhesive article according to claim 1, wherein the at least one polysilylated polymer(s) A) correspond(s) to the following formula:
formula (II):

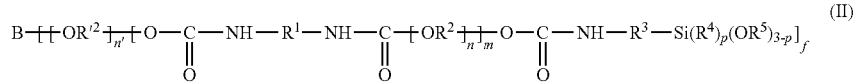

wherein:
B represents a divalent hydrocarbonated radical (for f=2) or trivalent (for f=3) comprising 2 to 66 carbon atoms, linear, branched, cyclic, alicyclic or aromatic, saturated or unsaturated, optionally comprising one or more heteroatoms,
$R^1$ represents a divalent hydrocarbonated radical comprising from 5 to 15 carbon atoms which can be aromatic or aliphatic, linear, branched or cyclic,
$R^3$ represents a linear or branched divalent alkylene radical comprising from 1 to 6 carbon atoms,
$R^2$ and $R'^2$ identical or different, each represent a linear or branched divalent alkylene radical comprising from 2 to 4 carbon atoms, $R^4$ and $R^5$ identical or different, each represent a linear or branched alkyl radical comprising from 1 to 4 carbon atoms, $R^4$ which can optionally be engaged in a ring,
n is a non-zero integer wherein the number-average molecular mass of the polyether block of formula $-[OR^2]_n$-ranges from 300 g/mol to 40,000 g/mol,
n' is a zero or non-zero integer wherein the number-average molecular mass of the polyether block of formula $-[OR'^2]_{n'}$—ranges from 0 to 20000 g/mol,
m is a zero or non-zero integer,
p is an integer equal to 0 or 1,
f is an integer equal to 2 or 3, and
indices m, n, n' and f are such that the number-average molecular mass of the polysilylated polymer(s) A) is as defined in claim 1.

5. The self-adhesive article according to claim 4, wherein m is non-zero.

6. The self-adhesive article according to claim 1, wherein the at least one polysilylated polymer(s) A) is a mixture of polysilylated polymer(s) comprising at least one polysilylated polymer corresponding to the formula (I) or the formula (II) and/or at least one polysilylated polymer corresponding to the formula (I) or the formula (II), wherein formula (I) and formula (II) are defined as follows:
formula (I):

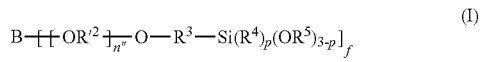

wherein:
B represents a divalent hydrocarbonated radical (for f=2) or trivalent (for f=3) comprising 2 to 66 carbon atoms, linear, branched, cyclic, alicyclic or aromatic, saturated or unsaturated, optionally comprising one or more heteroatoms,
$R^3$ represents a linear or branched divalent alkylene radical comprising from 1 to 6 carbon atoms,
$R'^2$ represents a linear or branched divalent alkylene radical comprising from 2 to 4 carbon atoms,
$R^4$ and $R^5$ identical or different, each represent a linear or branched alkyl radical comprising from 1 to 4 carbon atoms, $R^4$ which can optionally be engaged in a ring,
n" is a non-zero integer wherein the number-average molecular mass of the polyether block of formula $-[OR'^2]_{n''}$-ranges from 150 g/mol to 20,000 g/mol,
p is an integer equal to 0 or 1,
f is an integer equal to 2 or 3, and
the numbers n" and f are such that the number-average molecular mass of the polysilylated polymer(s) A) is as defined in claim 1; and formula (II):

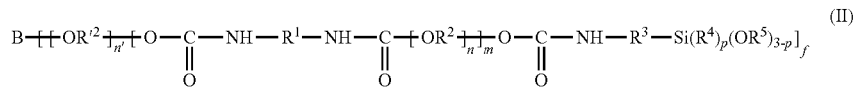

wherein:
- B represents a divalent hydrocarbonated radical (for f=2) or trivalent (for f=3) comprising 2 to 66 carbon atoms, linear, branched, cyclic, alicyclic or aromatic, saturated or unsaturated, optionally comprising one or more heteroatoms,
- $R^1$ represents a divalent hydrocarbonated radical comprising from 5 to 15 carbon atoms which can be aromatic or aliphatic, linear, branched or cyclic,
- $R^3$ represents a linear or branched divalent alkylene radical comprising from 1 to 6 carbon atoms,
- $R^2$ and $R'^2$ identical or different, each represent a linear or branched divalent alkylene radical comprising from 2 to 4 carbon atoms,
- $R^4$ and $R^5$ identical or different, each represent a linear or branched alkyl radical comprising from 1 to 4 carbon atoms, $R^4$ which can optionally be engaged in a ring,
- n is a non-zero integer wherein the number-average molecular mass of the polyether block of formula $-[OR^2]_n$-ranges from 300 g/mol to 40,000 g/mol,
- n' is a zero or non-zero integer wherein the number-average molecular mass of the polyether block of formula $-[OR'^2]_{n'}$-ranges from 0 to 20000 g/mol,
- m is a zero or non-zero integer,
- p is an integer equal to 0 or 1,
- f is an integer equal to 2 or 3, and
- indices m, n, n' and f are such that the number-average molecular mass of the polysilylated polymer(s) A) is as defined in claim 1.

7. The self-adhesive article according to claim 6, wherein the polysilylated polymer(s) A) is a mixture of polysilylated polymer(s) comprising at least one polysilylated polymer corresponding to the formula (I) or the formula (II), wherein p=0 and/or at least one polysilylated polymer corresponding to the formula (I) or the formula (II), wherein p=1.

8. The adhesive composition as defined in claim 6, comprising:
- A) at least 20% by weight of the at least one polysilylated polymer A) corresponding to one of formulae (I) or (II) or mixture thereof,
- B) at least 15% by weight of the tackifying resin mixture,
- C) at least 0.2% by weight of the at least one crosslinking catalyst, wherein the % by weight contents are based on the total weight of the adhesive composition, and the sum of the contents of all the ingredients of the adhesive composition are equal to 100%.

9. The composition of claim 8, wherein:
- the content of the polysilylated polymer(s) A) ranges from 20 to 84.8% by weight, of the weight of the adhesive composition,
- the content of the tackifying resin mixture B) represents from 15 to 79.8% by weight, of the weight of the adhesive composition, and
- the content of the crosslinking catalyst(s) C) ranges from 0.2 to 4% by weight of the weight of the adhesive composition.

10. The self-adhesive article according to claim 1, wherein the number-average molecular mass of the polysilylated polymer(s) A) ranges from 20,000 to 55,000 g/mol.

11. The self-adhesive article according to claim 1, further comprising a support layer coated with the self-adhesive layer, wherein the support layer has an elongation at break of strictly less than 100% and is based on acrylic polymers, polyethylene (PE), oriented, non-oriented or bi-oriented polypropylene (PP), polyimide, polyurethane, polyester or paper.

12. A product coated at its surface with the self-adhesive article of claim 1, said surface having a surface energy of less than or equal to 40 mN/m, said surface energy being measured at 23° C., at 50% relative humidity, at atmospheric pressure of 1 bar, in air.

13. A self-adhesive article comprising an adhesive layer consisting of a crosslinked adhesive composition comprising:
- E) at least one polysilylated polymer having a number-average molar mass (Mn) of at least 20000 g/mol, wherein the at least one polysilylated polymer comprises a polyether and/or polyurethane main chain and at least two hydrolysable silylated end groups, said silylated end groups being attached to the main chain of the polymer by a urethane or ether function (referred to as a connector group),
- F) a tackifying resin mixture comprising at least one type (i) and (ii) tackifying resin, wherein each resin has a hydroxyl number less than or equal to 50 and wherein type (i) and type (ii) tackifying resins are defined as follows:
  - i. one or more resins selected from the group consisting of PICCO AR-100, PICCO AR-85, NORSOLENE M1090, and PICCO A-10; and
  - ii. one or more resins selected from the group consisting of NORSOLENE W110 and NOROSLENE W85; and
- G) at least one crosslinking catalyst,
- H) excluding any monosilylated polymer.

14. A process for coating a substrate using the self-adhesive article according to claim 1, wherein the substrate has a surface energy measured at 23° C., at 50% relative humidity, at atmospheric pressure of 1 bar, in air, less than or equal to 40 mN/m, the adhesion strength of the self-adhesive article on said substrate measured by peeling at 180° being at least 4N.

* * * * *